United States Patent [19]
Horie et al.

[11] Patent Number: 5,504,499
[45] Date of Patent: Apr. 2, 1996

[54] COMPUTER AIDED COLOR DESIGN

[75] Inventors: Tohru Horie, Tokyo; Keiji Ohshima, Hitachi, both of Japan

[73] Assignee: Hitachi, Ltd., Tokyo, Japan

[21] Appl. No.: 82,910

[22] Filed: Jun. 29, 1993

Related U.S. Application Data

[63] Continuation of Ser. No. 852,497, Mar. 17, 1992, abandoned, which is a continuation of Ser. No. 724,457, Jul. 3, 1991, abandoned, which is a continuation of Ser. No. 324,665, Mar. 17, 1989, abandoned.

[30] Foreign Application Priority Data

Mar. 18, 1988 [JP] Japan ..................................... 63-63340

[51] Int. Cl.$^6$ ..................................... G09G 5/02
[52] U.S. Cl. .......................... 345/150; 395/131; 345/116; 348/642
[58] Field of Search ..................................... 345/150–155, 345/146, 147, 199, DIG. 2; 395/131; 348/642, 649, 659; 345/116

[56] References Cited

U.S. PATENT DOCUMENTS

| | | | |
|---|---|---|---|
| 4,459,677 | 7/1984 | Porter et al. | 340/750 |
| 4,601,003 | 7/1986 | Yoneyama et al. | 345/146 |
| 4,694,286 | 9/1987 | Bergstedt | 345/146 |
| 4,794,382 | 12/1988 | Lai et al. | 345/150 |

FOREIGN PATENT DOCUMENTS

| | | | |
|---|---|---|---|
| 0100798 | 2/1984 | European Pat. Off. | 340/721 |
| 59-154490 | 9/1984 | Japan . | |
| 62-44795 | 2/1987 | Japan . | |
| 8200726 | 3/1982 | WIPO | 340/701 |

OTHER PUBLICATIONS

"Lisa Draw"; Apple Computer Inc.; 1983; pp. 110–119.

*Primary Examiner*—Richard Hjerpe
*Assistant Examiner*—Mike Fatahiyar
*Attorney, Agent, or Firm*—Fay, Sharpe, Beall, Fagan, Minnich & McKee

[57] ABSTRACT

After an initial starting single color may or may not be provided, the user may indicate a global sensation, such as morning, so that all colors inputted thereafter will be modified by the global sensation, or input a basic color, such as blue. In either case, menu driven user input information may include any number of human sensations relating to color for modifying the previously compounded color. In each case, the newly compounded color is displayed in a color display area on the screen. Thus formed, new colors may be named and stored to be retrieved at a later date. The menus on the display screen may be grouped according to basic decisions, basic colors, and compounding modifications according to human sensations, which latter may be subgrouped according to specific types of sensations such as mood, feeling, temperature, and the like.

15 Claims, 6 Drawing Sheets

R1   "BLUE $0.5\, Ri \rightarrow R\bar{o}$
$0.5\, Gi \rightarrow G\bar{o}$
$0.5(1-Bi)\, Bi \rightarrow B\bar{o}$

*FIG. 3A*

R2   "MODERATE (MODERATE LEVEL) WARM"

$0.5 M_B(Bi) \rightarrow Bo$
if $|Gi - Ri| < 0.2$
 then
  $0.7\, M_r(1-Ri) + Ri \rightarrow Ro$
  $0.5\, M_G(1-Gi) + Gi \rightarrow Go$
 else
  if $Gi < Ri$
   then
    $Ri \rightarrow Ro$
    $Ri\, Gi\, M_G(1-Gi) + Gi \rightarrow Go$
   else
    $0.6\, M_R(1-Ri) + Ri \rightarrow Ro$
    $Gi \rightarrow Go$

*FIG. 3B*

```
┌──────────┐
│☐ STORE   │
│☐ NAME    │
│       A6 │
└──────────┘
```

*FIG. 4*

COMPUTER AIDED COLOR DESIGN

This is a continuation application of Ser. No. 07/852,497, filed Mar. 17, 1992, now abandoned, which is a continuation of Ser. No. 07/724,457, filed Jul. 3, 1991, now abandoned, which is a continuation of Ser. No. 07/324,665, filed Mar. 17, 1989, now abandoned.

BACKGROUND OF THE INVENTION

The present invention relates to computer aided color design, particularly the compounding of colors from primary colors with the aid of a computer.

In various fields, such as computer aided design, there is a need to provide the design of color, for example in coloring selected areas of a design. Other uses include the computer aided design of cosmetic coloring, and the like.

The usual for computer aided color designing involves the direct input of specific primary color proportions, such as directly inputting the proportions of red (R), green (G), and blue (B). Primary colors may also be referred to as elementary colors or reference colors, and there may be more than three, for example there might be four.

One such apparatus is disclosed in Japanese Laid Open Patent Application No. 59-154490/1984, wherein a display screen shows a triangle having its apexes representing the three primary colors R, G, B, with the user indicating a point within the triangle that represents a specific proportion of such three colors, so that a separate display area on the screen will then show the thus compounded color; other user information may be submitted.

A similar system is disclosed in Japanese Laid-Open Patent Application No. 62-44795/1987, wherein four columns represent four primary colors Y, M, C, B. The user will indicate a proportion for each of the four colors, and the thus compounded color will appear in a display area on the screen.

In each of these known devices and methods, specific percentages of the primary colors are directly inputted by the user.

SUMMARY

It is an object of the present invention to provide a computer aided color design that provides menu driven user information according to human sensations as opposed to specific percentages of primary colors.

More particularly, after an initial starting single color may or may not be provided, the user may indicate a global sensation, such as morning, so that all colors inputted thereafter will be modified by the global sensation, or input a basic color, such as blue. In either case, menu driven user input information may include any number of human sensations relating to color for modifying the previously compounded color. In each case, the newly compounded color is displayed in a color display area on the screen. Thus formed, new colors may be named and stored to be retrieved at a later date. The menus on the display screen may be grouped according to basic decisions, basic colors, and compounding modifications according to human sensations, which latter may be subgrouped according to specific types of sensations such as mood, feeling, temperature, and the like.

Accordingly, it is an object of the present invention to provide a computer aided color design that is easier to use than previously provided and which is based upon menu human sensations rather than menu technical proportions of primary colors.

BRIEF DESCRIPTION OF THE DRAWING

Further objects, features and advantages of the present invention will become more clear from the following detailed description of a preferred embodiment, shown in the accompanying drawing, wherein:

FIG. 3a illustrates the processing and algorithm associated with a basic color rule using blue as an example;

FIG. 3b illustrates the processing and algorithm associated with a compound modifying rule using the human sensation of moderate warm as an example;

FIG. 4 illustrates a display area of the display screen;

DETAILED DESCRIPTION OF A PREFERRED EMBODIMENT

Figure 1:
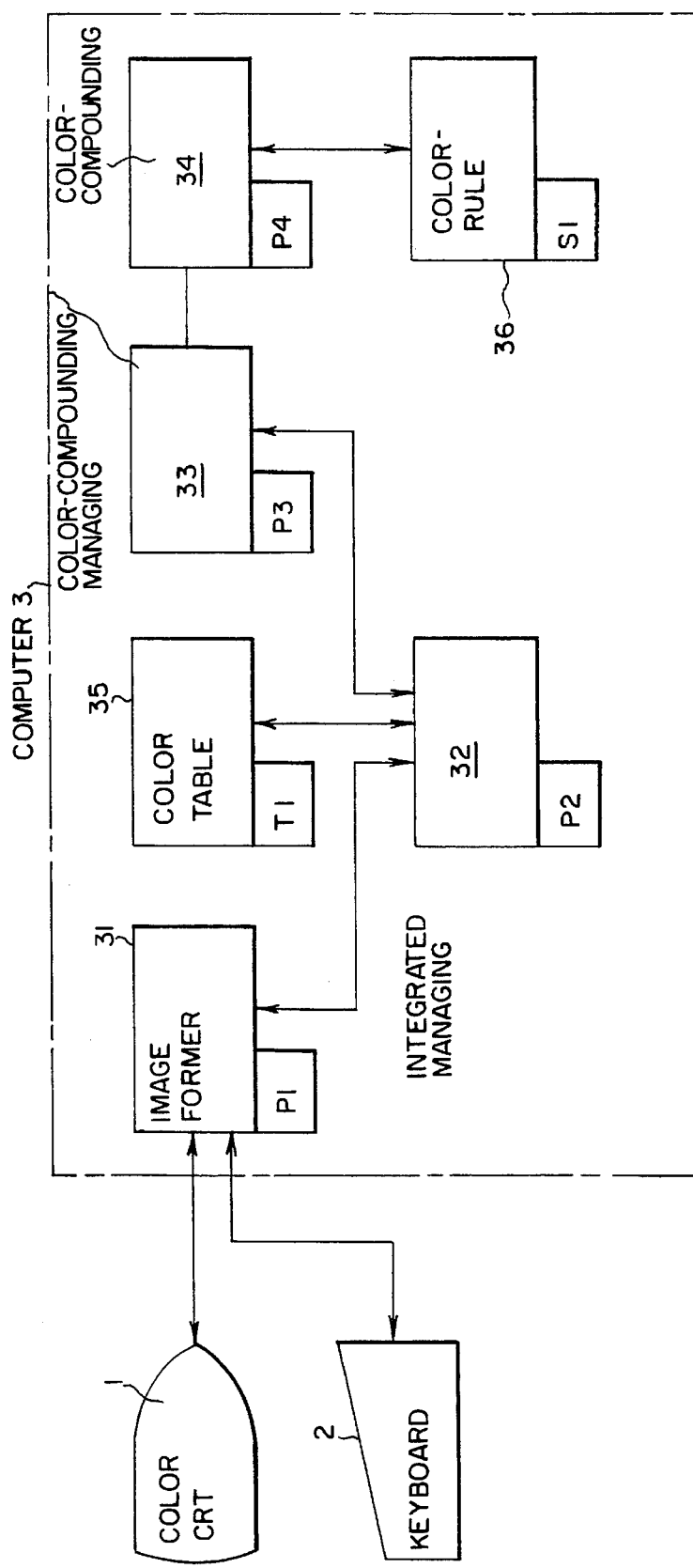
FIG. 1 schematically shows the display apparatus according to the present invention.

The present invention overcomes problems analyzed below with respect to the previously discussed conventional methods of computer aided color design.

A first problem associated with prior systems is that it is hard to obtain colors desired by an operator, that is, a user. When a person will compound colors depending upon color densities directly associated with three or more primary colors, the user must repeat trial input operations many times and the resulting colors may be not at all what is intended, with subtle differences still existing between what is obtained and what is desired without the user knowing how to correct for such subtle differences.

A second problem relates to the amount of skill that is required to compound colors in the known apparatus. An unskilled operator or user requires a very long time to compound the colors, because the percentages of three or four primary colors is not normally known even though the user could describe the described specific color.

A third problem relates to the discomfort experienced by the user with respect to the known systems. The user will input data to obtain a color that the user has visualized, but the color thus obtained with the known systems and displayed by them may be completely different from the expected one. If such should occur repeatedly, the user becomes displeased and frustrated.

The present invention is directed towards making a computer aided color design more user friendly, by being based upon known human sensations that are associated with colors and directed towards retrieving the expert knowledge of colors that all users have to some degree with respect to common human sensations associated by such colors. That is, the above problems are solved by a system operated upon the delicate human senses through simple and comfortable operations. The computer aided design or artificial intelligence or expert system is operated according to menu driven user input information based upon human sensations.

The present invention may be used in coloring illustrations produced by CAD systems. It may be used for producing colors that a user may desire for a particular cosmetic to be compounded, or used for various graphic displays, or further used with respect to word processing, particularly in a general publishing system. A computer associated with the present invention may be a simple personal computer or a computer of considerable power and greater complexity.

The display apparatus is particularly characterized by providing a display screen, particularly for displaying objects to be colored, and an input display area separate from or overlapping the object display area for inputting user information associated with menu indicia, such as items or words that represent actual compounded colors or human sensations associated with modifying compounded colors. User interaction is provided with instruction input that may be in the form of a touch panel, light pen, mouse, keyboard or the like. The selected indicia items of the menu are correspondingly associated with color compounding and rules stored in a memory location.

Human sensations, as used herein, refer to human concepts that may be expressed in words or other indicia such as symbols for describing human sensations, including emotions that have particular meanings with respect to colors and color modification Such sensations may relate to human sensations such as shapes, sounds, texture, intensity, touch and the like, that are commonly used to describe colors.

In the case of displaying colors, for example, the user initially may input a basic color from a menu that is near to the color to be achieved. Accordingly, the basic color indicated by the user is displayed on the screen. The thus displayed color is compounded according to a rule stored with respect to the menu basic color as proportions of primary colors, for example three or four in number. Thus, a compounded color is displayed on the screen. Alternatively, an initial compounded color may be displayed prior to any color selection by the user merely upon the user choosing to enter the computer program relating to color compounding. Upon examining the displayed compounded color, (initial, chosen basic or a modified initial or chosen basic color) the user, if dissatisfied, will choose, from one or more menus, a human sensation indicia of the menu that will modify the displayed compounded color toward the desired color according to common human sensations. The selected indicia being associated with the specific fixed compounding rule will change the current compounded color according to the fixed rule and display the thus compounded color. This procedure is repeated as many times as desired, with each new compound modifying rule associated with a selected indicia modifying the current compounded color according to its fixed rule.

The term compounding, as used herein, means applying one or a group of color compounding rules (basic and/or modifying) for a particular hue to the compounded color. A compounded color is a color that has been produced by such compounding. The compounding may be the production of an initial color or the fixed modification of the current compounded color. That is, a compounded color is subjected to further compounding to produce a new compounded color, which then may be selected to further compounding according to the user input based upon menu driven indicia representing human sensations. A rule is a set of instructions.

The overall display apparatus is shown in FIG. 1. A color display screen 1 may be a conventional CRT, a liquid crystal display, a gas discharge display, or the like. A computer 3, as shown, exchanges information with the display screen 1. Also, the computer 3 exchanges information with an input device 2 for inputting user information. The input device may be a keyboard as shown, or it may be a light pen for interacting with the display screen, a mouse, a digitizer, or the like. The computer may be of any conventional type, including a common personal computer. Structurally, the computer, as known, includes a cpu, storage device such as RAM and/or ROM, a data processing portion such as an ALU, various buses, various registers, and the like. A table T1 of color compounding rules is provided in a portion 35 of the storage device or memory. As will be seen later, these rules can include rules for compounding basic colors, and rules for modifying compounded colors.

The computer, as shown, is divided into functional units for purposes of illustration, although the relationship between such functional units and structure can be clear from conventional computer knowledge, for example, as indicated the functionally illustrated color look-up table 35 structurally is realized by a plurality of sets of instructions contained in memory. The computer further includes an image former 31, which includes the functions of a program P1, including input/output functions with the display screen 1 and the input device 2. Interacting with the image former 31, is an integrated manager 32, which includes program P2 and further interacts with the color table 35. Color compounding manager 33, including program P3, interacts with the integrated manager 32 and further interacts with the color compounder 34. The color compounder 34 includes program P4 and interacts with a color rule storage device including rule base S1 associated therewith. Each of the functional blocks 31, 32, 33, 34, 35, 36 includes both stored programs or data and data processing hardware.

Figure 2:
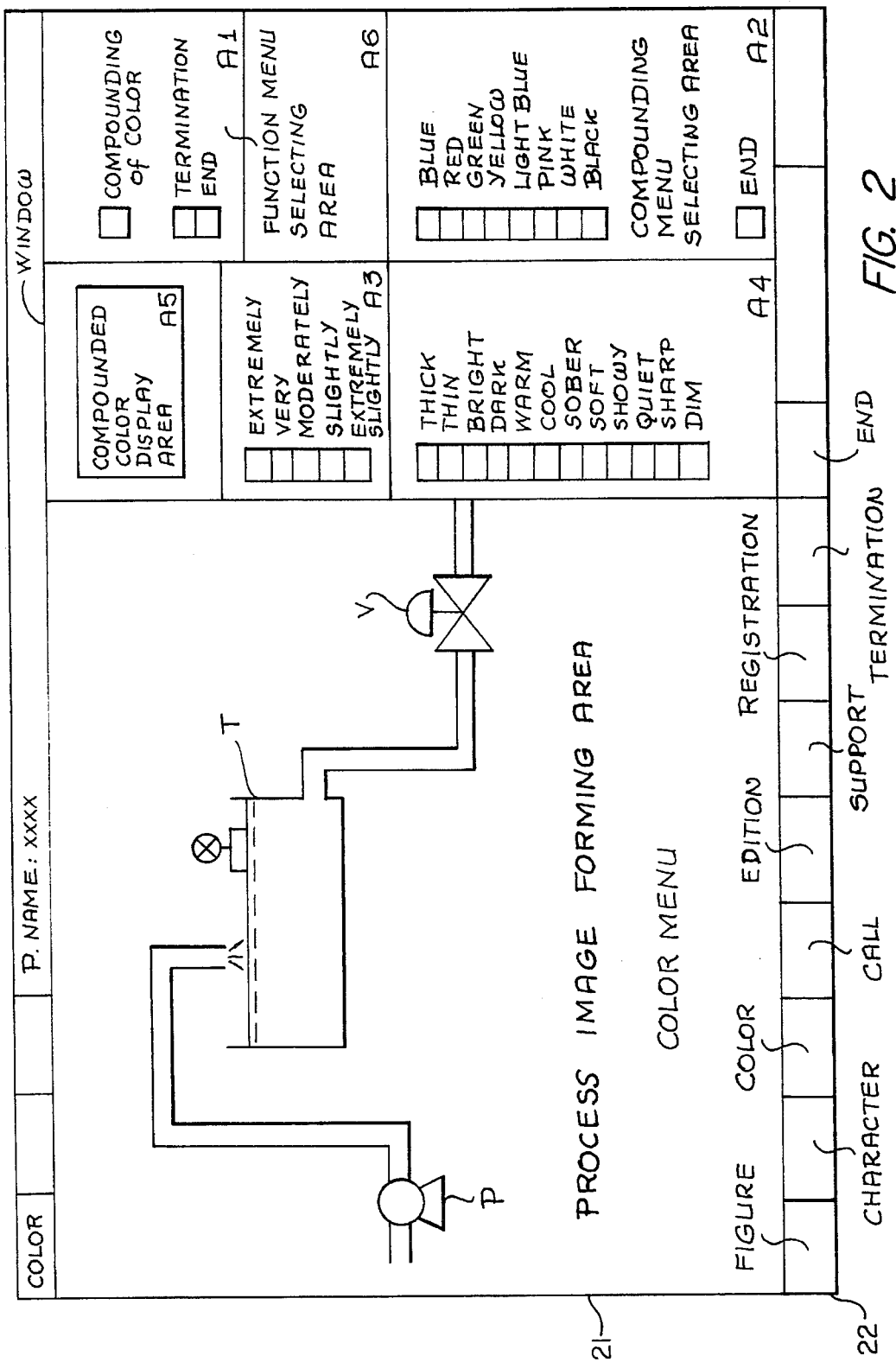
FIG. 2 shows an example of the display screen and interactive displays and menus for the user, according to the present invention.

FIG. 2 shows information or images typically displayed on a display screen, for user interaction with the remainder of the display apparatus of FIG. 1. While the display screen of FIG. 2 is divided into separate discrete display areas, for different purposes, it is also to be understood that the screen may have such areas overlapping each other. That is, it is possible to have the menus in the form of pop-up menus that will overlie a drawing, still allowing viewing of the drawing, or that will replace portions of the drawing. As shown in FIG. 2, there is an image forming area 21, which in the particular embodiment will contain the entire drawing, which has preferably been previously constructed, for example with a conventional CAD program. This drawing will include, for example, process facilities comprising a pump P, a tank T, a valve V, and piping between them. A menu area 22, extending along the entire bottom of the display screen, will contain general purpose items, as indicated in FIG. 2. These displayed choices in menu area 22 may be used for selecting various functions, including the function "color" that is used to start the program that is the main subject matter of the present invention. As indicated, user supplied information, such as a drawing name, and menu item selected from menu area 22 are shown along the top border of the display screen, for convenience.

Using the display apparatus of FIG. 1, and choosing the menu selection "color" in menu area 22 of FIG. 2, pop-up menus A1, A2, A4, A3, A6 will be presented on the display screen along with a compounded color display area A5.

Optionally, the program may be set for different help levels, so that one or more of the pop-up menus may be eliminated after the user becomes quite skillful and has the menu fixed within their mind and therefore not needing the menu to be displayed on the screen.

As previously mentioned, the computer operates under the control of the programs P1 through P4, using table T1 and rule base S1. Program P1 is a process image forming program. Program P2 is a program that interacts with program P1 and the other programs, for controlling the operation of the preferred embodiment, to provide display of a menu on a screen and to coordinate input of user information, all for communication with program P3. P3 is a color compounding managing program, which starts to run in response to a start request from the program P2. The program P3 generates a start request for program P4 to cause program P4 to perform an actual compounding operation. Program P4 performs the color compounding operation in accordance with color compounding rules, and coordinates the fetching of color compounding rules from memory, that is from the color compounding rule base S1, so as to perform the color compounding operation.

With respect to FIGS. 1–4, operation will be discussed along with the structure. A figure may be drawn in the image forming area 21, or retrieved from a drawing file and displayed in the image forming area 21, or, in the case of mere color selection as in cosmetics, it may be desired to have no figure at all in the image forming area 21. In any event, the present invention is directed towards the compounding of color, for various usages. The attributes of color may be set to any of eight classes, for example, to each of which any one of 4,096 colors (two to four colors for each of the three reference colors R, G and B) may be allotted. As mentioned, the present system may be based upon three primary or reference colors R, G and B, or four primary or reference colors.

A sequence of color input operations will be described in detail.

The program P2 is started by selecting "color" from the menu area 22 with respect to the image appearing on the screen as shown in FIG. 2, by the use of the program P1. Thereafter, the program P2 will cause a window W1, as shown in FIG. 2, to pop up or be displayed on the screen. FIG. 2 illustrates a specific example for this sequence of selections.

Thereafter, the program P2 will generate a function menu selection request and display a function menu A1 on the screen in a ready condition to accept an input. The operator will then select one of the functions on the menu A1, by means of the input device, which as mentioned can include a keyboard, light pen, mouse or the like. For example, with the menu A1, there are three selections, namely "color compounding", "termination", and "end". The user will input one of these three selections, for example by the known curser method using the keyboard 2 as shown in FIG. 1, or alternatively by a touch-panel method. It is to be understood of course that the menus may be on a separate menu selection board, such as printed on a digitizing table, for display of the menu and entry of the menu quite separately from the display screen. Alternatively, the menus may merely be in the mind of the user with entry being through the selection of keys on the keyboard to provide the appropriate commands for the menu selections. The input from any of the menus will hereinafter be called a "menu input". If "color compounding" is selected from menu A1 and inputted, then the program P2 will preferably display menu P2 on the screen as shown in FIG. 2, and simultaneously or successively place the compounding menus A2–A4 in the ready condition to accept a user input. The operator will menu input only one of the basic colors set forth in menu A2 that represents the color closest to the desired color. The basic colors as set forth in menu A2 are common color names, such as "blue", "red" and "light blue". As a result, a color close to the desired color is displayed in color compounded display area A5. The operations of the programs will be described below.

When "color compounding" has been menu-input from menu A1, the program P2 will set an initial value, for example an initial value of color may correspond to the color white. This automatic setting of an initial value from the color table T1 is optional. The program P2 will forward a request to the program P1 to perform a menu input from the menu A2. When the operator has performed a menu input, this event is transferred from the program P1 to the program P2, and the program P2 starts the operation of the program P3 to transfer the event and the value of color obtained from table T1. That is, the color table T1 contains rules, that is instruction sets, for combining the primary colors to obtain the basic colors set forth in menu A2. The program P3 transfers to the program P4 the data corresponding to the basic color white, which is the initial color or a basic color compounded according to the selection from menu A2, so as to cause a program P4 to compound a color. The thus compounded color information is sent through the program P2 on the color table T1. The compounded color is displayed in area A5.

The compounding of color performed by program P4 will be described below. For example, the user may select the basic color "blue" from the menu A2. The color-compounding basic rule for "blue" basic color is set forth as rule R1 in FIG. 3a. Since the initial compounded color is white with this particular example, the application of the color compounding basic rule for the basic color "blue" is applied to the initial compounded color, white. Alternatively, if there is no initial color, the color compounding basic rule for "blue" is merely an absolute proportion of the primary colors rather than a change in proportions of the initial color white. As shown in FIG. 3a, if the initial color is white, the basic color compounding rule will change the brightness of the red and green components to produce the basic color blue.

In particular, in FIG. 3a, with respect to the primary colors R and G of the three primary colors R, G and B, the output values Ro and Go are equal to half the input values Ri and Gi. The input values Ri and Gi are the values of red and green that make up the initial color white. With respect to the primary color B, the output value Bo is obtained by adding to the initial value Bi one half of the quantity of one minus the input value Bi, that is (1−Bi). Such a basic rule is a fixed part of the apparatus, and may be considered hardware as machine language stored in ROM, or considered as software stored in RAM. This color compounding basic rule for "blue" is stored in the rule base S1, in RAM or ROM at an address correlated to the selection of "blue" from the menu A2. Thus, compounding of colors can be achieved under the display screen in accordance with an input of a basic color, for example "blue", which directly represents a human sensation.

The result of the above color compounding is set on table T1 as color information, and this information is read by the program P2. The program P2 causes the obtained color to be displayed in the area A5. The program P2 will then put the menus A2 through A4 in a condition ready to accept an input and then wait for the next color compounding operations.

The next menu input will be performed with respect to menu A3, and with respect to at least one of menus A2 and A4. If a menu input is performed, such input event is transferred from program P1 to P2, and then program P2 will generate, on the basis of such event, an event for transfer to program P3. Program P3 will be started so as to transfer the event together with the value of the compounded color from table T1 to program P3. Program P3 will start program P4 to compound a color and will set the color information, which has been obtained as the result of the compounding by a program P4, in table T1 through program P2. The compounding of the color then performed by a program P4 will be described below.

For example, after the basic color "blue" has been chosen as previously described and displayed in area A5, the menu A3 may be used to select the human sensation related to color of "moderately", shown as a selection on menu A3 in FIG. 2 and further select the menu item "warm" shown as a menu option on menu A4. These two selections produce a color compounding request of "moderately warm", which will cause the fetching of a corresponding color compounded modifying rule R2, which rule is shown in FIG. 3b. With the compounded color blue, the application of the color modifying rule R2 will result in the reduction in brightness of the primary color B component of blue and an increase in the brightness of each of the primary colors R and G that are components of the color blue. That is, the color modifying rule chosen from the input from menus A3 and A4 combined has a fixed proportion of the input primary colors, with the input primary colors being those that determine the current compounded color displayed in A5, to produce a new current compounded color. In FIG. 3b, MR, MB, and MG are constants. As a result of this operation, a new current compounded color, which can be described as moderately warm blue, is obtained and displayed in area A5.

The color information obtained as a result of compounding is placed on table T1 and read by the program P2. Program P2 cause the obtained color to be displayed in the area A5 as the compounded color. The desired color will be approached step by step by repeating the process from the menu input with respect to menu A4 and menu A3 as many times as needed.

When the ultimate or desired color has satisfactorily appeared in the area A5, the operator can terminate the compounding of the color by menu-inputting "termination" from menu A1 so that program P2 will acknowledge the termination of color information inputting from the menus A3 and A4 and then the color information of the current compounded color is transferred to the process image forming program at a desired location according to a process well known in CAD programs, and thereafter the window W1 is closed, that is the menus A1, A2, A3, A4, A6 and display area A5 will no longer be displayed on the screen. For example, the area of the drawing, for example the tank T2, which has been indicated after termination of the color compounding program or prior to the beginning of the color compounding program will then receive the current compounded color.

In general, the computer software and hardware is well known, for example in CAD programs, for choosing a basic element, such as a rectangle, from a table storage or library of the elements for placement at a location on the screen and thereafter movement to a desired location in a drawing. According to the standard CAD, the chosen basic element, such as a rectangle, can be modified in its proportions, by various menu selected rules such as zoom, rotate, line thickness and the like. The present invention may be physically constructed in much the same manner.

FIGS. 1–3 have set forth an operative basic portion of the preferred embodiment. The preferred embodiment includes further details that may or may not also be present, and which are shown in the remaining figures of the drawing, described below.

Figure 5:
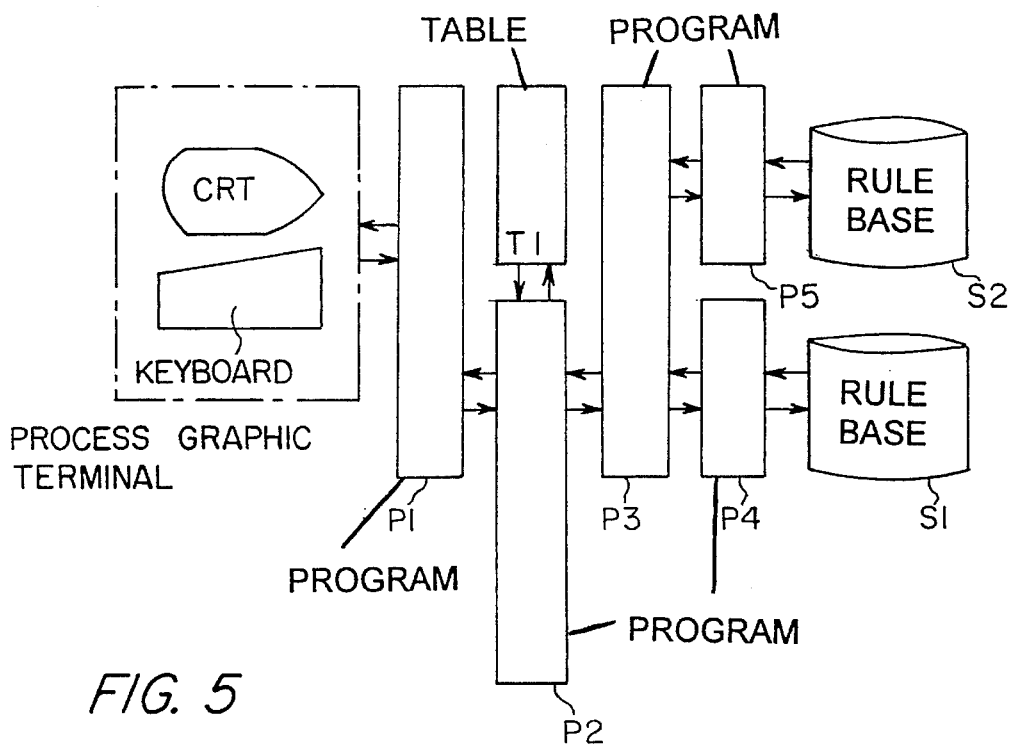
FIG. 5 is a flow chart indicating one operation and the organization of the display apparatus.

The computer, including software, may include a further function relating to program P5 as shown in FIG. 5 for modifying a rule that has been previously stored in the computer in rule base S2. To achieve this modification, menu selection items of "modification of compounding-rule" and "termination of modification of compounding rule" are added to the function menu, for example the menu A1 of FIG. 2. The operator selects these items when performing a menu input from menu A1, then the operation as shown in FIG. 5 will be performed.

If the operator inputs a request to modify a color compounding rule, then program P3 will terminate the operation of compounding the compounded color described in connection with the above description, and menu A6 as shown in FIG. 4 will be displayed on the screen and placed in the condition ready for input by the operator, which placing of menu A6 will also give an indication that the program for modifying a rule is to be carried out. If "memorization of reference color" is menu inputted by the user, then program P3 will memorize the color information of the current compounded color as a compounding rule reference color. Thereafter, program P3 will put in a condition in which items in the compounding menus A2–A4 or names inputted by the operator on each of required occasions can be input in the intervals between compounding operations of the compounded color, and at the same time the computer will successively memorize a group of rules to be used in the compounding operations thereof to produce the thus named color that has been just memorized as requested. The operation under such condition will be described in the case where a item existing in the menu is input, and in a separate case where a new name is to be given. (1) In a case where an item in the menu is input, program P5 will operate on the basis of the color compounding rules for the item, the group of rules executed in compounding operations after the reference color has been memorized, and the color information of the compounding rule reference color, so as to generate the color compounding rule corresponding to the item, and then will replace the color compounding rule for such item in S1 of FIG. 1 with the generated color compounding rule. (2) In the case where a new name is given: program P5 will operate on a group of rules on the basis of the group of rules executed in compounding operations after the reference color has been memorized, and the color information of the compounding-rule reference color, so as to obtain a color-compounding rule of a new name. It is stored in S1 together with the new color name given by the operator. Also, such event is transferred from program P3 to program P2, and program P2 enables the display in the window W1 as a menu for compounding and further enables menu inputting of this new name basic color. That is, a new basic color is added to the menu A1 by this process according to program P5. Thus, thereafter, the new basic color will be brought up each time the program is run and may be immediately selected.

Figure 6:
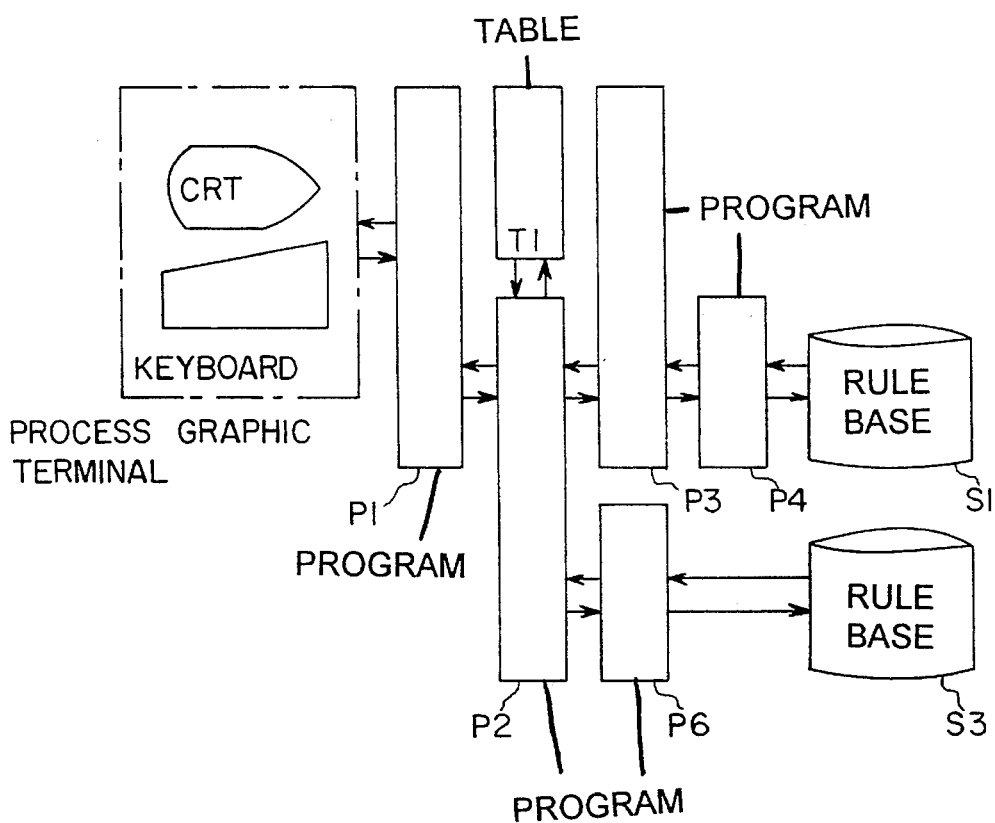
FIG. 6 is a flow chart indicating another operation and the organization of the display apparatus.

FIG. 6 further shows the addition of a color-name defining and storing program P6. Menu items such as "definition of color name" and "calling of color name" are added to the selections for menu A1. If the user selects one of these menu choices from menu A1, program P6 will be placed into operation.

Figure 8:
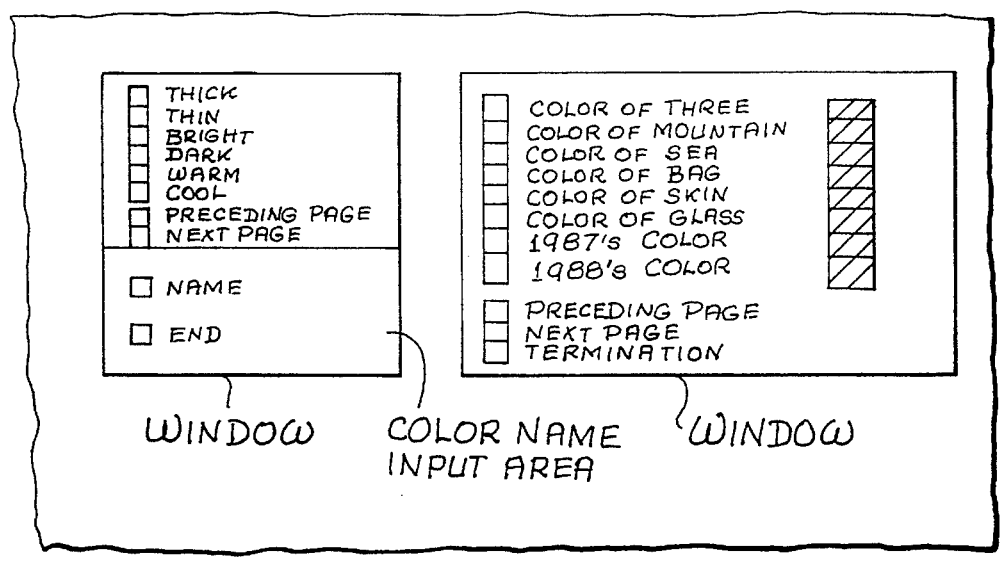
FIG. 8 is an illustration of a portion of the display screen showing two display areas, that is, or windows.

If the operator menu inputs a request to define a color name from menu A1, program P2 shown in FIG. 6 will display a color name display window W2 shown in FIG. 8. Further, the computer will place a color name input area A7 in window W2 in a condition in which any name can be input from the input device. Then, the operator will input an arbitrary name and program P2 will transfer to P3 such event, that is the inputted name. Color information of the color will then be displayed in the area A5 associated with such inputted name. Program P3 will start P6 so as to transfer the color name and the color information to program P6, so that program P6 will store such information at an address associated with such name in the color base S3 of a color information storage device. The thus stored colored name and color information can subsequently be used as a whole as a basic color chosen from the menu A1, that is thereafter the new name will appear on the menu A1.

The window W3 shown in FIG. 8 is a window for the input of stored colors. The stored color is displayed on the display screen when a request to call the color name has been input, and a color is then displayed in window W3 by the operation of program P6 reading a color name and color information from S3 upon a request for start from program P2 to program P6. In window W3 there is displayed a list of the colors represented by the stored color names and corresponding color information, and actual colors in themselves can be menu-input.

If the operator menu inputs a desired color from window W3, program P2 will obtain from program P6 the color information corresponding to the selected color name and stored in S3, and then will display the color corresponding to it in the compound color display area A5 and at the same time will set the color information on table T1.

Figure 10:
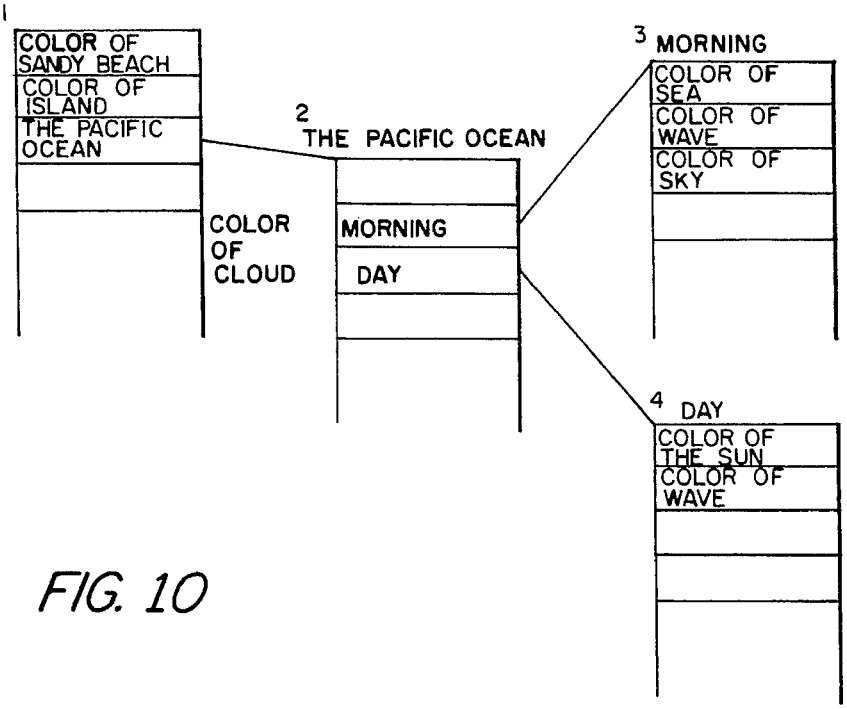
FIG. 10 illustrates the grouping of color compounded modifying rules on a functional basis and their interaction.

Grouping of colors is shown in FIG. 11. This is effective when colors are to be compounded for a scene, for example, which is consistent as a whole. The entire seen will be formed with harmonized colors, using tables (1)–(4), which are in a stratified relationship between one another as shown in FIG. 10. For example, if the "pacific ocean" in table (1) is selected, names such as "color of clouds", "morning" and "day" will appear in table (2). They have a color name and a table name designating a lower-ranking table. In this case, an identical "color of waves" appears in tables (3) and (4), but they are recognized as different colors because they are associated with "morning" and "day", respectively. That is, a selection such as "pacific ocean" may be considered as a global command, which will modify subsequent selections such as clouds, that is, calling up a color for cloud will display a color that is modified according to pacific ocean. Similarly, a global command such as morning will subsequently produce a called up basic color such as color of waves that is different from the color of waves if the previous global command had been "day".

In FIG. 10, if "pacific ocean" in Table (1) is to be color compounded with "warm", for example, the color-compounding is performed with "warm" with respect to all the tables (2), (3) and (4), as global commands.

Figure 7:
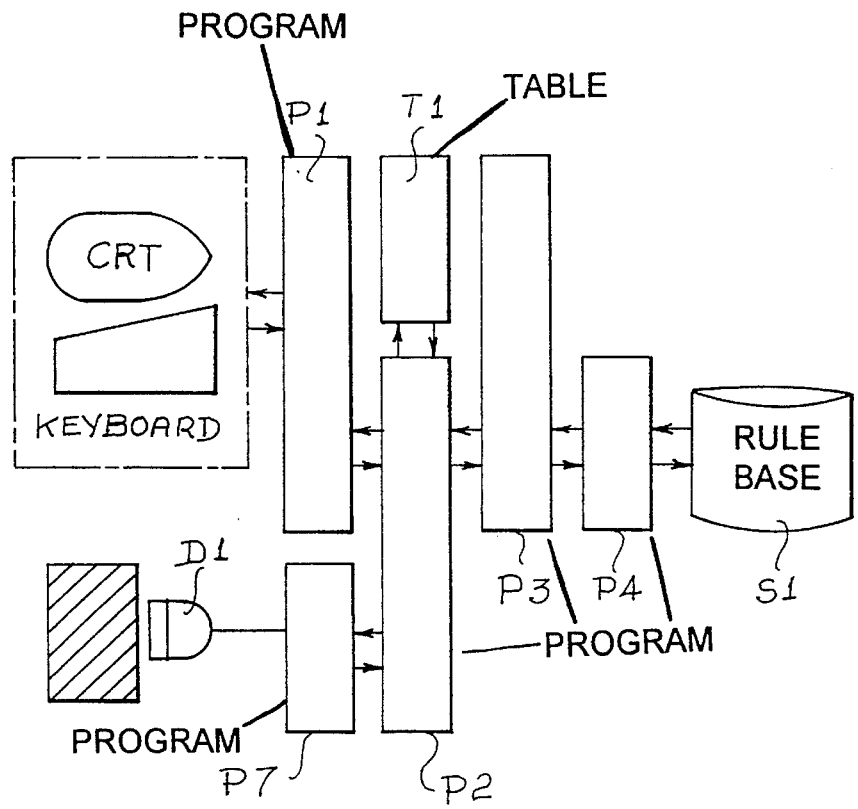
FIG. 7 is a flow chart indicating a further operation and organization of the display apparatus.

A further program, color information direct-input program P7, may be provided as shown in FIG. 7, which includes the integrated management program P2 and an object color input device T1. With the addition of the input device D1 and program P7, further menu selections such as "color direct input" are added to the menu A1. If the operator selects and inputs the "color direct input" choice from menu A1, operation is initiated with program P7. The operator will, by performing the menu input according to the present discussion, set an object or color sample in a position to be read by the color input device D1 or conversely the color input device D1 may be moved into a position to read a sample. The color input device D1 may be an image pick up device such as a photographic camera, a television camera, or other optical imaging device. Next, if the user menu inputs a request for the direct input of color from menu A1, then program P2 will start program P7 to cause the color input device D1 to read the color information of the object or color sample for the input of a color sample. Such input color information is transferred from program P7 to program P2, and program P2 determines the appropriate combination of rules to provide color information on the table T1 that will produce a facsimile in the color display area A5. Thus, the actual color of the object can be used in compounding colors. The actual color read in from an object can be not only used in compounding colors, but according to preceding programs actually stored for future use.

The present invention is applicable to various fields. For example, it may be applied to determine colors to be applied to goods such as motor cars and domestic electric appliances during design. In such a case, the present apparatus can be used with a CAD device connected to it. It may be useful in the case of forming a picture, such as computer graphics. Further, it might be useful in coloring characters on graphs, for example, in a document.

Figure 9:
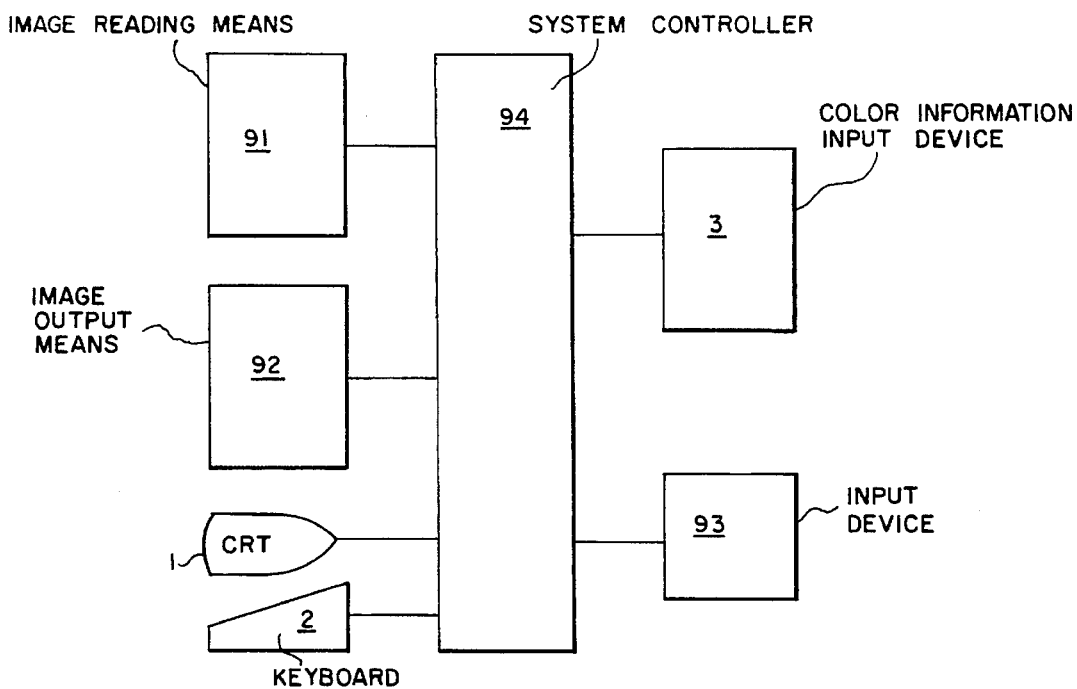
FIG. 9 is a flow chart indicating another operation of the display apparatus according to the present invention.

A standard arrangement of the apparatus for use in such cases is shown in FIG. 9. In FIG. 9, an image reader 91 for reading drawings, for example, and an image outputter 92 for the output of drawings, for example, on a sheet of paper, and input device 93 such as a mouse, and a system controller 94 for the communication between them and for the control of them are operatively associated to constitute the apparatus of FIG. 1. In accordance with the present invention, input operations of human sensations related to color by known human experiences can be performed with comfort and ease for the compounding of colors with computer aided design. There is an additional effect that the present invention allows a non-skilled operator to perform complex color compounding, particularly of subtle colors.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. Color display apparatus, comprising:

a color display screen;

input means for inputting user information;

computer means for receiving the user information from said input means, for displaying information, including colors, on said screen, and for processing data;

means for storing a plurality of separate different rules for compounding a fixed number of primary colors, with said rules including separate basic color rules fixing the proportion of said primary colors for each of a corresponding plurality of basic compounded colors, and separate modifying rules for modifying, each in a fixed manner, the proportions of the primary colors as stated in the basic color rules for producing modified compounded colors;

means for providing a first menu of the basic compounded colors;

means responsive to the user information from said input means for selecting a basic compounded color from said first menu to retrieve the corresponding basic color rule from said means for storing and to display the basic compounded color corresponding to the retrieved basic color rule on said screen;

means providing a second menu of modifiers for said basic compounded colors;

means responsive to the user information from said input means for selecting a modifier from said second menu to retrieve the corresponding modifying rule from said means for storing, modifying said retrieved basic color rule according to said retrieved modifying rule and displaying the resulting compounded color on said screen; and menu driven user input means for defining a human color sensation as a global command for controlling automatically the modifying of any subsequently selected basic compounded color according to the global command, so that alternately the user may select a basic compounded color and thereafter successively modify it by selecting one of the modifiers or initially select the global command for controlling automatically thereafter the modifying of any subsequently selected basic compounded color.

2. The display apparatus according to claim 1, wherein said screen includes a fixed color display area for receiving the displayed compounded color.

3. The display apparatus according to claim 2, wherein said screen includes a fixed area for displaying said first menu and a separate fixed menu display area for displaying said second menu, each of said menus being displayed in an area separate from said color display area.

4. The display apparatus according to claim 3, wherein said computer means includes computer aided design software and hardware for creating and displaying drawings on said screen, and said computer means further including menu driven user input means for transferring said compounded color to a selected portion of a drawing appearing on said screen.

5. The display apparatus according to claim 1, wherein said means for selecting a modifier further modifies a previously modified basic color rule of the modified compounded color.

6. The display apparatus according to claim 1, further including menu driven user input means for selectively naming with a unique name any one of the modified compounded colors as a new basic compounded color, for storing a new rule for compounding for exactly duplicating said new basic compounded color at a storage address corresponding to said name, and thereafter displaying said new basic compounded color in response to user input of said name so that the new basic compounded color may be directly accessed during any subsequent usage by the user.

7. The display apparatus according to claim 1, wherein said modifying rules are divided into rule groupings having menu indicia for correspondingly addressing said modifying rules, with the menu indicia being grouped according to human senses and emotions.

8. The display apparatus according to claim 7, wherein said menu indicia include indicia groupings of quantity of light, touch, mood, clarity, physical appearance, and scenic imaging.

9. The display apparatus according to claim 1, wherein said means for storing includes a table of said rules.

10. The display apparatus according to claim 1, wherein there are three of said primary colors, and said modifying rules each specify output proportions of the three primary colors that are fixedly proportional to the input proportions of said three primary colors of the current compounded color.

11. The display apparatus according to claim 1, wherein there are four of said primary colors, and said modifying rules each specify output proportions of the four primary colors that are fixedly proportional to the input proportions of said four primary colors of the current compounded color.

12. The display apparatus according to claim 2, wherein said computer means including memory driven user input means for initiating color compounding and displaying a single initial color in said color display area prior to the selection of a basic compounded color by said means for selecting, and said rules for compounding outputting a basic compounded color as fixed proportions of the primary color proportions of said initial color.

13. The display apparatus according to claim 1, wherein said second menu provides said modifiers as indicia representing human sensations as menu items, corresponding to said modifying rules, on said screen.

14. The display apparatus according to claim 1, including means for providing menu driven user input for naming, defining and storing new modifying rules for future menu retrieval.

15. The display apparatus according to claim 1, further including means for optically determining the color of any color sample provided externally to the display apparatus and matching the color sample to a plurality of said rules that will together reproduce a facsimile color of the color sample on said display screen, and being user menu driven to name and store the facsimile color for future retrieval under a unique name.

* * * * *